United States Patent [19]

Mehra et al.

[11] Patent Number: 4,826,897

[45] Date of Patent: May 2, 1989

[54] PROCESS FOR RECLAIMING POLYETHYLENE TEREPHALATE SCRAP CONTAMINATED WITH CHLORINE-CONTAINING POLYMER

[75] Inventors: Vinodkumar Mehra; Pallatheri M. Subramanian, both of Wilmington, Del.

[73] Assignee: E. I. DuPont de Nemours and Company, Wilmington, Del.

[21] Appl. No.: 947,835

[22] Filed: Dec. 30, 1986

[51] Int. Cl.[4] .................. C08L 27/06; C08L 27/08; C08L 33/08; C08L 67/00
[52] U.S. Cl. .................................. 523/455; 523/456; 523/457; 524/394; 524/424; 524/425; 524/427; 525/166; 525/169
[58] Field of Search .............. 525/208, 222, 240, 166, 525/164, 182; 524/425, 361, 437, 424, 427, 394; 523/457, 456, 455; 521/46, 48

[56] References Cited

U.S. PATENT DOCUMENTS

| | | | |
|---|---|---|---|
| 4,032,594 | 6/1977 | Serratore et al. | 525/74 |
| 4,460,729 | 7/1984 | Books | 524/513 |
| 4,455,407 | 6/1984 | Yamane et al. | 525/208 |
| 4,602,046 | 7/1986 | Buser et al. | 521/46 |

FOREIGN PATENT DOCUMENTS

| | | |
|---|---|---|
| 2307846 | 11/1976 | France . |
| 54-144453 | 11/1979 | Japan . |
| 912739 | 3/1982 | U.S.S.R. . |
| 1352088 | 5/1974 | United Kingdom . |

OTHER PUBLICATIONS

Technical Bulletin, Kyowa Chemical Industry Co. (data unknown) on DMT-4A (Hydrotalcite-like Compound).

Chevassus et al, "The Stabilization of Polyvinyl Chloride", Edward Arnold Ltd., London, 1961, pp. 281, 352, 353.

*Primary Examiner*—Allan M. Lieberman
*Attorney, Agent, or Firm*—Paul R. Steyermark

[57] ABSTRACT

Polyethylene terephthalate scrap material containing on its surface a chlorine-containing polymer such as, for example, polyvinylidene chloride or polyvinyl chloride, can be recovered and reused by melt-blending it with a polymer from a defined class of ethylene copolymers containing an epoxy group, and melt processing the blend in the same manner as virgin polyethylene terephthalate. The recovered and reprocessed polymer material has good physical properties and barrier properties.

18 Claims, No Drawings

PROCESS FOR RECLAIMING POLYETHYLENE TEREPHALATE SCRAP CONTAMINATED WITH CHLORINE-CONTAINING POLYMER

BACKGROUND OF THE INVENTION

This invention relates to a process for the recovery and reuse of scrap of polyethylene terephthalate (PET) coated with a chlorine-containing polymer as well as to useful articles made from such recovered material.

There is a large amount of PET scrap available to the industry for reuse from such sources as, e.g., PET bottles, fibers, and film. A substantial amount of this scrap is difficult to use because some PET film and bottles which require greater impermeability to oxygen and water are coated with a thin layer of a chlorine-containing polymer. This usually is a vinylidene chloride homopolymer or a vinylidene chloride copolymer with a minor amount (about 0.1–10 weight percent) of another vinyl comonomer, which itself may or may not be chlorinated. The identity of those additional comonomers may vary according to the manufacturer and usually is considered proprietary by the film coating industry. Further, polyvinyl chloride and copolymers of vinyl chloride with minor amounts of other unsaturated monomers can be used in those applications. In addition, a chlorine-containing polymer is coated on photographic polyester film base for adhesive purposes. When a vinylidene chloride polymer is used as the coating material, the amount of such coating normally is about 0.01–0.24 weight percent of the total coated polymer weight. However, this amount is not critical and can be adjusted as appropriate for a particular application. Normally scrap material consisting of PET coated with a chlorine-containing polymer cannot be used as such and has to be boiled with sodium hydroxide or subjected to other chemical treatment to remove the polymer coating. For example, vinylidene chloride polymer degrades at about 200° C., which is below the normal processing temperature of PET. If scrap PET containing vinylidene chloride polymer is inadvertently used in processing, hydrogen chloride is released, resulting in degradation and discoloration of the PET and corrosion of the equipment. The art has not heretofore described any practical method of melt processing that would make possible the use of PET scrap contaminated with vinylidene chloride polymers or vinyl chloride polymers without prior complete removal of the chlorine-containing polymer contaminant.

It thus can be readily seen that a process for recovering and reusing such PET scrap material, of which there are available millions of kilograms every year, would be of great industrial interest.

SUMMARY OF THE INVENTION

According to this invention, there is now provided a process for recovering and reusing scrap material of polyethylene terephthalate coated with a chlorine-containing polymer, said process comprising combining said scrap material with about 5–25% based on the weight of said scrap material of an ethylene copolymer E/X/Y, where E is the radical formed from ethylene and comprises about 40–99.5 weight percent of the ethylene copolymer;

X is the radical formed from

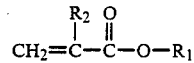

where:
- $R_1$ is an alkyl group with 1–8 carbon atoms, preferably 4–6 carbon atoms, and most preferably 4 carbon atoms;
- $R_2$ is hydrogen, methyl, or ethyl, preferably hydrogen or methyl, and most preferably hydrogen;
- and X comprises about 0–40 weight percent, preferably 15–35 weight percent, and most preferably 20–35 weight percent of the ethylene copolymer; and Y is an epoxy group-containing copolymerizable monomer selected from the class consisting of epoxy esters of copolymerizable unsaturated organic acids, epoxy ethers having a copolymerizable vinyl or allyl group, and monoepoxy-substituted diolefins of 4 to 12 carbon atoms, and comprises about 0.5–20 weight percent, preferably 2–10 weight percent, and most preferably 3–8 weight percent of the ethylene copolymer, and melt-blending the combined polymer materials at a temperature of about 260°–310° C.

Additional comonomers, e.g., CO and methyl acrylate, can also be present in a minor amount, provided that the physical and mechanical properties of the ethylene copolymer are not substantially altered. It is unlikely that less than the lower limit of the ethylene polymer range would be effective, while more than the upper limit can be expected to result in excessive crosslinking of the system.

DETAILED DESCRIPTION OF THE INVENTION

The preferred comonomer Y is selected from the class consisting of glycidyl methacrylate and glycidyl acrylate, and the preferred ethylene copolymer E/X/Y is the ethylene/n-butyl acrylate/glycidyl methacrylate terpolymer.

The ethylene copolymers used in the process of the present invention can be prepared by direct copolymerization, i.e., by copolymerization of ethylene, the epoxy group-containing monomer Y, and the above comonomer X, if present, at elevated temperature and pressure in the presence of a free-radical polmerization initiator. The polymerization temperature preferably is about 100°–270° C. and most preferably 130°–230° C. The polymerization pressure usually is above 70 MPa, but preferably within the range of 140–350 Mpa.

This copolymerization process as well as this class of copolymers in general are known and/or are described in British Pat. No. 1,352,088 to Sumitomo Chemical Company, Ltd. In addition to the above E/X/Y copolymer, the polymer blend may contain a small amount, about 5–25 percent, based on the total polymer weight, of a low modulus toughening polymer. Suitable toughening polymers are described in U.S. Pat. No. 4,172,859 to Epstein, which is hereby incorporated by reference. Typical toughening polymers are, for instance, the following alternating or random copolymers: ethylene/isobutyl acrylate/methacrylic acid terpolymer; ethylene/methyl acrylate/monoethyl maleate terpolymer, and 0–100% neutralized zinc, sodium, calcium, lithium, antimony, and potassium salts thereof;

and ethylene/vinyl acetate/carbon monoxide terpolymer.

Scrap from PET coated with vinylidene chloride polymers and similar chlorine-containing polymers is a thermoplastic material which can be processed, e.g., blended, extruded, or injection-molded at the same temperatures as virgin PET resin, i.e., about 270° to 310° C. Naturally, PET scrap derived from commercial grade PET resin will be used. Blending of the scrap material can be conducted in any suitable commercial equipment, such as extruders or blenders, but preferably in extruders maintained at a barrel temperature such that the polymer material is heated to a melt temperature of about 260° to 310° C.

It has been very surprisingly found that when a blend of scrap material of PET coated with a chlorine-containing polymer is blended with an ethylene copolymer E/X/Y according to the above definition and the blend is thus fabricated in normal polymer melt-processing equipment, such as extruders or injection-molding machines, degradation and/or discoloration of the polymers and corrosion of equipment are much reduced. The resulting fabricated articles have acceptable mechanical properties for many applications and good barrier properties inherent in PET. They are thus suitable for commercial use, e.g., in various types of containers and especially in cans for solvent-based paints, as well as in films.

It has further been found that significant additional improvements can be obtained when about 0.05–1.0%, based on the weight of the scrap material, of another additive such as calcium carbonate, calcium stearate, another metal stearate, or of hydrotalcite is added to the blend with E/X/Y copolymer. Those other metal stearates can be any metal stearates commonly available or used as lubricants, soaps, and the like, e.g., zinc stearate, aluminum stearate, sodium stearate, potassium stearate, etc. Hydrotalcite is a natural mineral which has the formula $Mg_6Al_2(OH)_{13}CO_3.4H_2O$. Instead of natural hydrotalcite, a synthetic product of a slightly different formula $Mg_{4.5}Al_2(OH)_{13}CO_3.3.5H_2O$ can be used in the same manner. The synthetic material is available from Kyowa Chemical Industry, Co., Ltd. (Osaka, Japan) under the name DHT-4A. Hydrotalcite, whether natural or synthetic, can be calcined if desired, to remove the crystallization water.

This invention is now illustrated by the following examples of certain preferred embodiments thereof, where all parts, proportions, and percentages are by weight unless otherwise indicated:

EXAMPLE 1

PET scrap was a film made from PET having an intrinsic viscosity of about 0.58, as measured in solution in a 60:40 phenol/tetrachloroethane mixture, oriented and heat set, some of which had been coated with a layer of a vinylidene chloride polymer. The amount of the vinylidene chloride copolymer was such that the chlorine content of the coated scrap material was 320 ppm.

The film was cut into small flakes, blended with a second polymer, and extruded through a Werner & Pfleiderer twin screw extruder, equipped with a die to make strands, and the strands were cut up into small pellets for further processing. The extruder was equipped with a vent. The melt temperature of the polymer was about 280° C. The pellets obtained from this step were injection-molded at a mold temperature of about 40° C. into tumblers or tensile test bars. The tumblers were 94 mm high, had a diameter of 56 mm at the bottom and of 70 mm at the top. The side walls as well as the bottom were 1.6 mm thick. The test bars of the standard size for this test were ⅛-inch (3.2 mm) thick and were tested under the standard conditions of ASTM D256.

The other polymer with which PET scrap material was blended was either an ethylene/n-butyl acrylate/glycidyl methacrylate (67:28:5) copolymer (EBAGMA) or an ethylene/n-butyl (74:26) acrylate copolymer (EBA), the latter being outside the scope of this invention. Toughness of the injection-molded tumblers was determined using an instrumented impact tester (modified Gardner impact) on the bottom of the tumblers. The determination was conducted with 40 Joules of impact energy, using an impact penetration shaft of 1.25 cm diameter and a spherical point of 6 mm radius. Sample failure was accomplished by total penetration of the impactor, and this required an energy that was less than the impact energy. The results are summarized in the table below.

| PET Film Scrap | Composition, % Cl Polymer | EBA | EBAGMA | Instrumented Impact, Joules |
|---|---|---|---|---|
| 75 | None | 25 | 0 | 3.9 |
| 85 | None | 0 | 15 | 36.2 |
| 75 | None | 0 | 25 | 33.3 |
| 85 | 320 ppm Cl | 15 | 0 | 0.25 |
| 75 | 320 ppm Cl | 25 | 0 | 0.12 |
| 85 | 320 ppm Cl | 0 | 15 | 1.3 |
| 75 | 320 ppm Cl | 0 | 25 | 1.4 |

Toughness is considered acceptable in this type of experiment when the instrumented impact value is greater than 1.0 Joule. However, it should be kept in mind that the preferred embodiment of this invention would involve operation at a reduced pressure, the extruder vent communicating with a source of vacuum, rather than with the atmosphere. Under those conditions, much higher impact values can be expected, and a value of 1 Joule would be considered poor. The experiments in this example show that 15–25% EBAGMA gives satisfactory toughness when working with a vinylidene chloride-containing PET scrap material, while 15–25% E/BA does not. Uncoated PET can be processed satisfactorily in either case.

EXAMPLE 2

In another set of tests, in which test bars were made, when the extruder process had stabilized (about 15 minutes), the off-gas from the vent of the extruder was passed through two absorption traps containing 0.1N sodium hydroxide. The gases bubbled through the two traps for 25 minutes in each case.

The contents of the traps were then analyzed for chlorine content by chromatography.

In a run within the scope of the invention, EBAGMA was blended at a level of 20% with a vinylidene chloride polymer-containing PET scrap. In the control run, an identical scrap material was blended with an E/BA copolymer at the same level. In both cases, the chlorine content in the PET scrap was 660 ppm. The experimental results are given in the table below.

| | Toughness, Notch Impact (Joules/m) | Amount of Chlorine As Chloride In Off-Gases (μg) |
|---|---|---|
| Control | 37 | 3531 |
| Invention | 157 | 1192 |

The substantial reduction in the chlorine evolved and and increase of toughness show the efficiency of EBAGMA in stabilizing the system.

EXAMPLE 3

The procedure of Example 1 was followed, except that the vent port of the extruder used to make the pellets was connected to a vacuum source and operated at a reduced pressure of approximately 10 kPa. In the first run, no additives were present in the blend of PET scrap with EBAGMA. In the second run, a small amount of calcium stearate (Technical Grade, Fisher Scientific, Inc.) was added to the blend, and in the third run a small amount of DHT-4A (Kyowa Chemical Industry, Ltd.). In all the runs, the PET scrap material contained vinylidene chloride polymer in such an amount that the total chlorine content was 320 ppm. The results are tabulated below.

| Composition, % | | | Instrumented Impact Strength, Joules |
|---|---|---|---|
| PET Scrap | EBAGMA | Additive | |
| 85 | 15 | 0 | 8.4 |
| 84.7 | 15 | 0.3 (a) | 36.7 |
| 84.7 | 15 | 0.3 (b) | 37.6 |

(a) calcium stearate
(b) synthetic hydrotalcite

It can be seen that, even in the absence of additives, when pelletization is run at a reduced pressure, a considerably higher impact strength is obtained than when venting at the atmospheric pressure (cf., Example 1). This improvement is further considerably enhanced by adding to the blend either calcium stearate or hydrotalcite.

We claim:

1. A polymer blend composition consisting essentially of scrap material of polyethylene terephthalate coated with a chlorine-containing polymer selected from the group consisting of polymers of vinyl chloride and polymers of vinylidene chloride, said scrap material being melt-blended with about 5–25% based on the weight of said scrap material of an ethylene copolymer E/X/Y, where E is the radical formed from ethylene and comprises about 40–99.5 weight percent of the ethylene copolymer;

X is the radical formed from

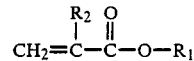

where:
$R_1$ is an alkyl group with 1–8 atoms;
$R_2$ is hydrogen, methyl, or ethyl;
and X comprises about 0–40 weight percent of the ethylene copolymer; and Y is an epoxy group-containing copolymerizable monomer selected from the class consisting of epoxy esters of copolymerizable unsaturated organic acids, epoxy ethers having a copolymerizable vinyl or allyl group, and monoepoxy-substituted diolefins of 4 to 12 carbon atoms, and comprises about 0.5–20 weight percent the ethylene copolymer.

2. A composition of claim 1 where $R_1$ contains 4–6 carbon atoms.

3. A compsition of claim 2 where $R_1$ contains 4 carbon atoms.

4. A composition of claim 1 where Y is selected from the class consisting of glycidyl acrylate and glycidyl methacrylate.

5. A composition of claim 3 where the ethylene copolymer is a copolymer of ethylene, n-butyl acrylate, and glycidyl methacrylate.

6. A composition of claim 1 where $R_2$ is hydrogen or methyl.

7. A composition of claim 6 where $R_2$ is hydrogen.

8. A composition of claim 1 where X comprises 15–35 weight percent of the ethylene copolymer.

9. A composition of claim 8 where X comprises 20–35 weight percent of the ethylene copolymer.

10. A composition of claim 1 where X is absent.

11. A composition of claim 1 wherein Y comprises 2–10 weight percent of the ethylene copolymer.

12. A composition of claim 11 wherein Y comprises 3–8 weight percent of the ethylene copolymer.

13. A composition of claim 1 containing about 0.05–1%, based on the weight of the scrap material, of an additive selected from the group consisting of calcium carbonate, calcium stearate, other metal stearates, and natural or synthetic hydrotalcite.

14. A composition of claim 1 where there is also initially present in the blend about 5–25%, based on the total polymer weight, of a toughening polymer.

15. An article obtained by melt fabricating a composition of claim 1.

16. An article obtained by melt fabricating a composition of claim 5.

17. An article of claim 15 which is a container or a film.

18. An article obtained by melt-fabricating a composition of claim 5, which is a container or a film.

* * * * *